United States Patent
Lee

(10) Patent No.: US 8,763,098 B2
(45) Date of Patent: Jun. 24, 2014

(54) MECHANISM FOR FACILITATING DYNAMIC AND CONTINUOUS TESTING OF SECURITY ASSERTION MARKUP LANGUAGE CREDENTIALS IN AN ON-DEMAND SERVICES ENVIRONMENT

(75) Inventor: Jong Lee, Pleasanton, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 13/552,498

(22) Filed: Jul. 18, 2012

(65) Prior Publication Data

US 2013/0145445 A1    Jun. 6, 2013

Related U.S. Application Data

(60) Provisional application No. 61/567,228, filed on Dec. 6, 2011.

(51) Int. Cl.
*G06F 7/04* (2006.01)
*G06F 21/31* (2013.01)

(52) U.S. Cl.
CPC ..................................... *G06F 21/31* (2013.01)
USPC ................ 726/6; 726/3; 726/4; 726/5; 726/7; 726/8; 726/9; 713/168; 709/225; 709/229

(58) Field of Classification Search
CPC ....... G06F 21/41; G06F 21/577; G06F 21/00; G06F 21/31; G06F 2221/033; G06F 11/3604; G06F 8/10; H04L 63/0815; H04L 67/02; H04L 67/20; H04L 67/30; H04L 9/32; H04L 9/321
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

*Primary Examiner* — Eleni Shiferaw
*Assistant Examiner* — Gregory M Elmore
(74) *Attorney, Agent, or Firm* — Blakely, Sokoloff, Taylor & Zafman LLP

(57) ABSTRACT

In accordance with embodiments, there are provided mechanisms and methods for facilitating dynamic and continuous testing of security assertion markup language (SAML) credentials in an on-demand services environment. In one embodiment and by way of example, a method includes identifying, at a computing device, an organization using a SAML process in an on-demand service environment, obtaining SAML credentials relating to the identified organization, and testing the SAML credentials relating to the identified organization. The testing includes asserting a set of test credentials against the SAML credentials relating to the identified organization. The method may further include generating one or more new codes based on testing results obtained from testing.

11 Claims, 7 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0089625 A1* | 4/2009 | Kannappan et al. ............ 714/39 |
| 2010/0287291 A1* | 11/2010 | Blakley et al. ................ 709/229 |

* cited by examiner

MECHANISM FOR FACILITATING DYNAMIC AND CONTINUOUS TESTING OF SECURITY ASSERTION MARKUP LANGUAGE CREDENTIALS IN AN ON-DEMAND SERVICES ENVIRONMENT

CLAIM OF PRIORITY

This application claims the benefit of U.S. Provisional Patent Application No. 61/567,228, entitled "Live Single-Sign-On Data Feed and Continuous Testing Framework" by Jong Lee, filed Dec. 6, 2011, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic and continuous testing of security assertion markup language credentials in an on-demand services environment.

BACKGROUND

Security Assertion Markup Language (SAML) single-sign-on (SSO)-related problems are well-known when logging users from an identity provider to a service provider in a multi-tenant environment. For example, given the complexity of SAML, it is well-known that making changes (even those regarded as minor) to the user login information, the runtime environment, etc., can breakdown the user login process.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Figure 1:
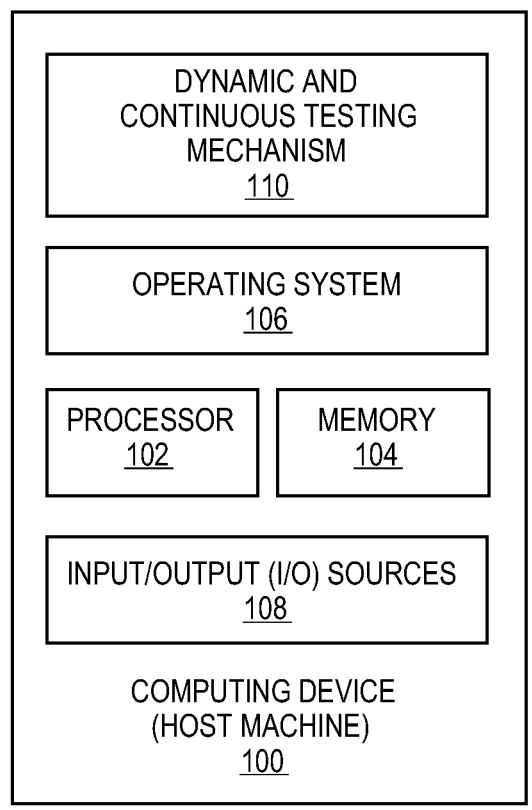
FIG. 1 illustrates a computing device employing a dynamic and continuous testing mechanism according to one embodiment.

Methods and systems are provided for facilitating dynamic and continuous testing of security assertion markup language (SAML) credentials in an on-demand services environment. In one embodiment and by way of example, a method includes identifying, at a computing device, an organization using a SAML process in an on-demand service environment, obtaining SAML credentials relating to the identified organization, and testing the SAML credentials relating to the identified organization. The testing includes asserting a set of test credentials against the SAML credentials relating to the identified organization. The method may further include generating one or more new codes based on testing results obtained from testing.

The method may further include modifying one or more codes based on the testing results, deploying the one or more new and modified codes for future SAML processes associated with the organization or other organizations, and logging one or more failures as determined from the testing results, and pushing the SAML credentials into a cache, where the SAML credentials include assertions and configurations associated with the organization. The method further includes reading the SAML credentials from the cache, and downloading the SAML credentials to a testing cache for testing.

Conventionally, SAML single-sign-on (SSO) has problems when logging users from an identity provider into a service provider, particularly in a multi-tenant environment. For example, a user using SAML to single-sign-on into their own or primary organization from their identity provider, typically, first logs into their corporate website then clicks on a link to log into a another/separate or secondary organization. However, because of SAML, the user typically does not need to re-login to the secondary organization, but instead, the first identity provider may send an SAML request on behalf of the user and logs into the second organization. However, due to the complexity of SAML, a service provider associated with the secondary organization may experience that customer login processes can break easily, especially when there are changes (even those regarded as minor) to, for example, the runtime environment. In one embodiment, customer configurations associated with various organizations and/or users are continuously tested, including their various SAML assertion formats, and dynamically updated before pushing the relevant code out to production.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for dynamic and continuous testing of live single-sign-on data feed in an on-demand services environment having a multi-tenant database system will be described with reference to example embodiments.

FIG. 1 illustrates a computing device 100 employing a dynamic and continuous testing mechanism 110 according to one embodiment. In one embodiment, computing device 100 serves as a host machine employing a dynamic and continuous testing mechanism ("testing mechanism") 110 to facilitate dynamic and continuous testing of SAML SSOs and any relevant data (e.g., assertions, codes, security authentications, etc.) may be continuously updated and properly maintained to promote SSO processes with maximum efficiently and minimal downtime. Computing device 100 may include server computers, desktop computers, cluster-based computers, set-top boxes (e.g., Internet-based cable television set-top boxes, etc.), and the like. Computing device 100 may also include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers (e.g., notebooks, netbooks, Ultrabook™, etc.), e-readers (e.g., Kindle®, Nook®, etc.), Global Positioning System (GPS)-based navigation systems, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "machine", "host machine", "device", "computing device", "computer", "computing system", "multi-tenant on-demand data system", and the like, may be used interchangeably and synonymously throughout this document. It is to be further noted that terms like "application", "software application", "program", "software program", "package", and "software package" may be used interchangeably and synonymously throughout this document.

Figure 2:
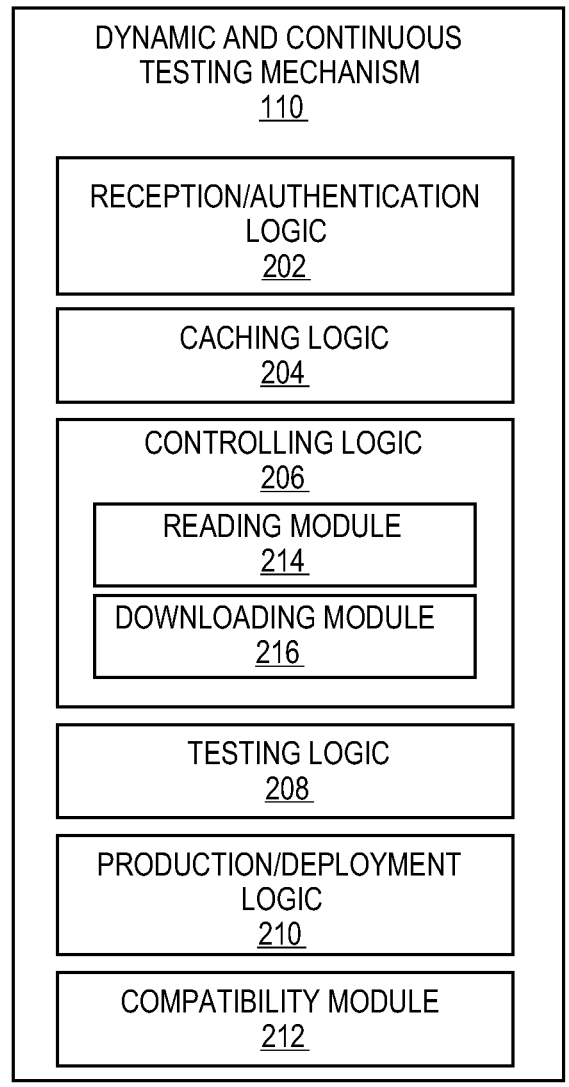
FIG. 2 illustrates a dynamic and continuous testing mechanism according to one embodiment.

FIG. 2 illustrates a dynamic and continuous testing mechanism 110 according to one embodiment. In one embodiment, testing mechanism 110 includes various components 202-216, such as reception/authentication logic 202, caching logic 204, controlling logic 206 having a reading module 214 and a downloading module 216, testing logic 208, production/deployment logic 210, and compatibility logic 212. It is contemplated that any number and type of components may be added to and/or removed from testing mechanism 110 to facilitate various embodiments including adding, removing, and/or enhancing certain features. For brevity, clarity, and ease of understanding of testing mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes. For example, although this document primarily focuses on SAML SSOs, but it is contemplated that embodiments are not limited to simply SAML or SSO and that they may be applied to and compatible with other existing and future technologies, standards, and protocols, such as post office protocol (POP), etc.

SAML refers to an extensible markup language (XML)-based open standard for exchanging authentication and authorization of data between security domains, such as identity providers (also referred to as "producers of assertions"), service providers (also referred to as "consumers of assertions"), and the like. SAML assumes that a user (also referred to as "principal") is enrolled with at least one identify provider who is expected to provide local authentication services to the user. A service provider relies on an identity provider to identify the user and, for example, at the user's request, the identity provider passes an SAML assertion to the service provider and it is based on this assertion that the service provider makes an access control decision. A user may refer to and include an end-user including, but not limited, to an independent individual or a person (such as an owner, a contractor, an employee, such as a receptionist, an accountant, a system administrator, a software programmer, etc.) associated with an organization (such as a company, a small business, a government agency, an academic institution, a non-profit organization, etc.).

SSO refers to a property of access control of multiple related, though independent, software systems. Using this property, a user may log in and obtain access to these systems without being prompted to log in again each system. It is contemplated that different users may be associated with different organizations and conversely, a single user logging into different systems may require support for different (and changing) authentication mechanisms, standards, credentials, and the like.

In one embodiment, testing mechanism 110, via compatibility logic 212, is dynamically compatible with any number and type of organizations and their static and changing authentication mechanisms, standards, protocols, and the like. For example, reception/authentication logic 202 receives the SSO relating to a user associated with an organization from an identify provider after the user has attempted to log into a system and then authorizes the user log in and relevant credentials using any number of authentication and/or authorization techniques. Upon receiving and authenticating the user log in, in one embodiment, caching logic 204 facilitates pushing or dumping of data (including SAML assertions, configurations, user/organization credentials, etc.) into a cache or caching system. The cache may act as a data storage for storing the data for various organization including the organization associated with the user. Since each organization typically have a single SAML configuration associated with it, in one embodiment, a single or sample assertion for each organization may be tested. In other embodiments, all or any number of assertions may be tested.

In one embodiment, controlling logic (or simply "controller") 206, via its reading module 214, accesses and reads the data placed in the cache and then, using its downloading module 216, downloads the data (including cached assertions and configurations) to be tested by testing logic 208. Controlling logic 206 may employ and associate one or more endpoints (e.g., assertion download endpoint) to its reading and downloading modules 214, 216 to facilitate accessing and reading of cached assertions (e.g., SAML assertions) and configurations followed by their downloading so they may be tested by testing logic 208. In one embodiment, the data provided to testing logic 208 is continuously tested, such as it is run against changed runtime logic with simple assertions and configurations, to determine whether the existing code need be changed for a particular organization.

In one embodiment, SAML assertions and configurations relating to each organization is continuously tested by testing logic 208 to prepare and be ready for any potential login or other changes based on historical assertion/configuration data associated with that and other organizations. For example, if a first primary organization A uses method I and a second primary organization B uses method II to access the secondary organization, testing logic 208 may continue to test any assertions and configurations relating to methods I and II as well as based on any available historical data relating to these and other primary organizations. Subsequently, if a primary organization changes its method, whether voluntarily or by force, any test results relating to that primary organization may be dynamically updated via testing logic 208. The updates results are used to form newer or updated codes that are then provided to production deployment logic 210 to be produced and deployed for the reception/authentication logic 202 to use for future logins.

Continuing with our example, if primary organization B changes its method (e.g., user login credentials for its users, such userID length, password character requirement, etc.) from method II to method III, it can do so without any problems as reception/authentication logic 202 recognizes method III using the method III code as dynamically produced and deployed at reception/authentication logic 202 by production/development logic 210 based on the relevant testing results provided by testing logic 208.

In one embodiment, testing logic 208 may work with a standalone/batch client to run tests and/or other codes on the development code base to fetch and validate SAML assertions from the production environment. The standalone client may be invoked each time the provider pushes code changes to production at production/deployment logic 210. The batch client may include a continuous process to run over some fixed intervals. Further, this way, testing logic 208 may validate and perform regression testing on a development code base for any number and types of primary organizations so that customer SSO processes are not broken and when changes and updates go live and that the process is dynamic and complete.

In one embodiment, various processes, such those performed by caching logic 204, controlling logic 206, testing logic 208, production/deployment logic 210, may be customized or predefined as desired or necessitated. For example, caching by caching logic 204 can be made to work according to various predefined limitations, such as time constraint (e.g., the cache's time-to-live), size constraint (e.g., limits on how much data is to be stored at the cache), etc. Further, various refresh and clear operations may be supported. For example, if a user mistakenly uses an incorrect login and then clears, refreshes, or deletes it, the operation may be discarded or voided at reception/authentication logic 202 to prevent the testing mechanism 110 from unnecessarily processing a voided transaction.

In one embodiment, caching logic 204 may perform its functions based on one or more of (1) an organization by recognizing it through its identification (organization ID) being regarded as a key and setting a value based on the organization's SAML assertion and configuration settings; (2) per instance, not per application server; (3) a predetermined time period, such as the cached data expires in 24 hours; and (4) size, such as a maximum of 5000 assertions per day, etc. Similarly, controlling logic 206 may import and download SAML assertions and corresponding configuration settings based on one or more of (1) a method to list all keys (e.g., organization IDs); (2) a method to download the assertions and configuration settings relating to an organization based on its organization ID; (3) a method to clear the cache; and (4) internet protocol (IP) restriction, such as only internal clients may be allowed to use the service, etc.

For example and in one embodiment, controlling logic 206 may be invoked after certain data has been cached by caching logic 204. Upon invocation of controlling logic 206, any keys relating to their corresponding organizations are fetched and further, for each key, its corresponding organization's SAML assertions and configurations are fetched from the cache. At this point, in some embodiments, the data may be validated and its summary might be provided in a status report for the benefit of a system administrator (e.g., via email). In one embodiment, the data is then downloaded to a local storage device to be tested by testing logic 208. In some cases, testing logic 208 may test the data once (by comparing against existing and/or historical data relating to that particular organization (as determined by the key) and/or other organizations) or test it repeatedly either automatically as preset or as deemed necessary and appropriate by, for example, a system administrator. This result of test may then be stored at a local storage device or provided to production/deployment logic 210 to generate and deploy a new code or make appropriate changes to an existing code to dynamically and automatically accommodate any configuration or other changes triggered by users, organizations, change in system resources, or the like.

In some embodiments, various security measures may be employed to minimize security risk. For example, controlling logic 206 may be IP restricted (e.g., the endpoint may be made IP restricted). Additionally, certain input authentication and other security information may be required before controlling logic 206 may be triggered or used. Further, any amount of data (such as including endpoint information) may be encrypted using an encryption technique. Other security measures may include, but are not limited to, (1) SAML disallowing replays (such as an SAML assertion can be restricted to be used once), (2) building in validation processes to avoid preventable errors, such as one that can be expected with downloading an SAML assertion from an endpoint and then reposting it may result in a login failure even when the SAML assertion is valid, (3) associating a timeout value to each SAML assertion so the endpoint associated with controlling logic 206 may not export that assertion that is timed out or expired, etc.

Figure 3:
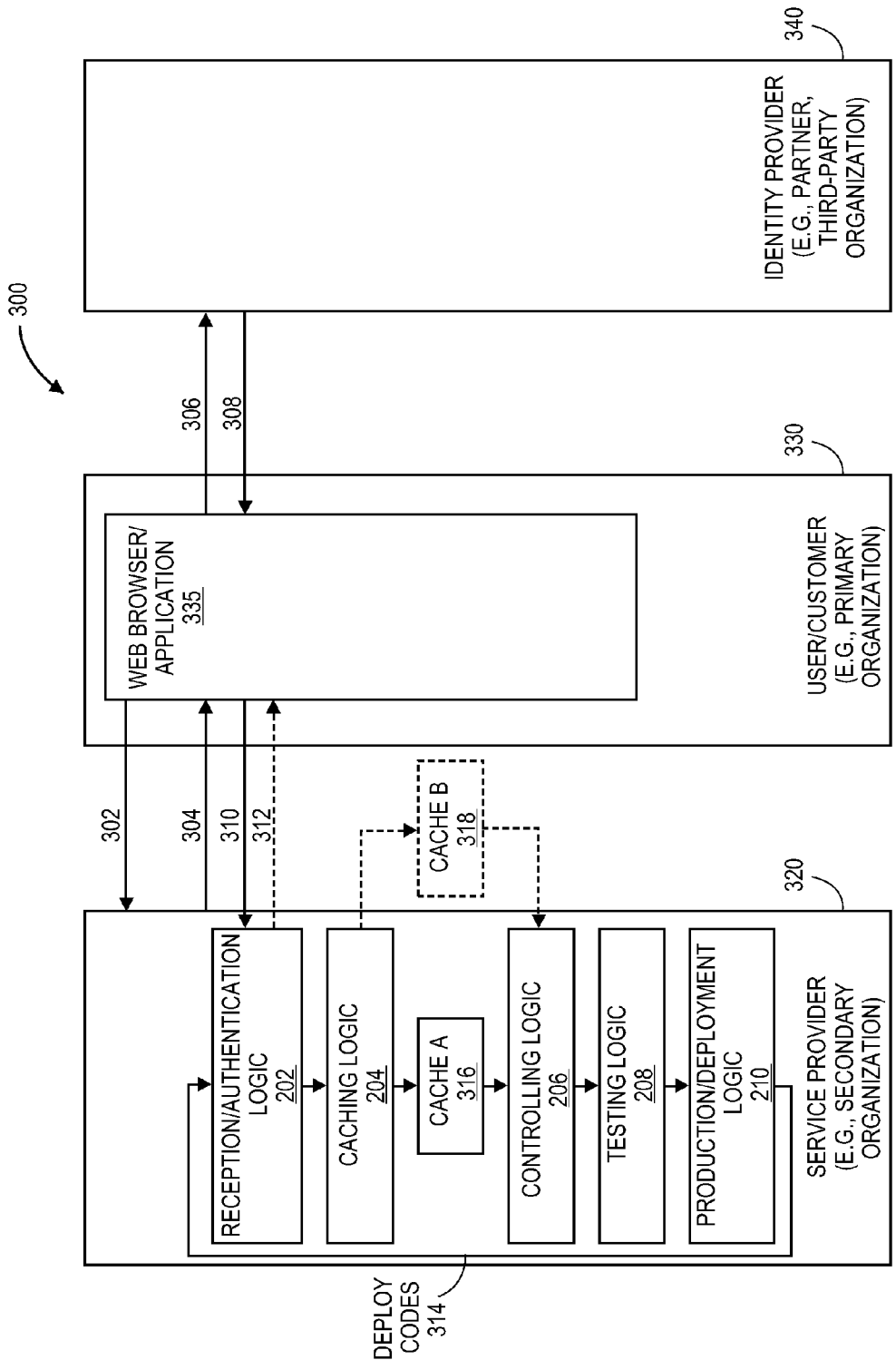
FIG. 3 illustrates a transaction sequence for performing dynamic and continuous testing of assertions and configurations according to one embodiment.

FIG. 3 illustrates a transaction sequence for performing dynamic and continuous testing of SAML assertions and configurations according to one embodiment. Transaction sequence 300 may be performed by processing logic that may comprise hardware (e.g., circuitry, dedicated logic, programmable logic, etc.), software (such as instructions run on a processing device), or a combination thereof. In one embodiment, transaction sequence 300 may be performed by dynamic and continuous testing mechanism 110 of FIG. 1.

Transaction sequence 300 begins with a user 330 at a primary organization (e.g., customer, client, etc.), using a locally-downloaded software application (e.g., web browser) 335, initiating a process 302 to reach a software application (e.g., a business application) hosted or provided by a service provider (e.g., secondary organization, such as salesforce.com) 320. In response, the service provider 320 generates an SAML request and, using the SAML request, redirects 304 the browser 335 to an SSO Uniform Resource Locator (URL), and as a result, the browser 335 redirects 306 to the SSO URL and provides the SAML to an identity provider (e.g., a partner company, a third-party organization, etc.) 340. The identity provider 340 parses the SAML request, authenticates the user, and generates an SAML response and then, encodes the SAML response and provides 308 the encoded SAML response to the browser 335. The browser 335 forwards 310 the SAML response to reception/authentication logic 202 at the service provider 320 where it is received and authenticated or verified as described with reference to FIG. 2. Upon authentication/verification, the user 330 may be allowed 312 to log into the application hosted by the service provider 320. In some cases, the user 330 may be disallowed from accessing the application for any number of reasons, such as for failing the login authentication.

In one embodiment, as described with reference to the dynamic and continuous testing mechanism 110 of FIG. 2, while the user 330 is logged in (or not), the SAML assertions and configurations collected from the SAML response received at the service provider 320 are then provided to caching logic 204 which facilitates its caching at a cache, such as an internal or local cache A 316 and/or an external or remote cache B 318. It is contemplated that any number of local and remote cache may be employed and used and that embodiments are limited to the ones illustrated here. The cached SAML assertions and configurations are accessed and read by controlling logic 206 and then downloaded into a testing cache to be tested by testing logic 208. Testing may include comparing the downloaded assertions and configurations against other recently-received assertions and configurations in the cache and/or previously-tested assertions and configurations relating to the primary organization 330 or other primary organizations. Testing results obtained from the testing of the SAML assertions and configuration are then provided to production/deployment logic 210 where one or more codes are produced and/or more existing codes are updated by the production/deployment logic 210. The new and/or updated codes are then deployed 314 so they may be accessed and used by the reception/authentication logic 202 for future user logins without having the need to breakdown any processes in case of any changes, such as changes to login requirements, SAML assertions, credentials, configuration information, other information relating to the user/customer 330, etc.

Figure 4:
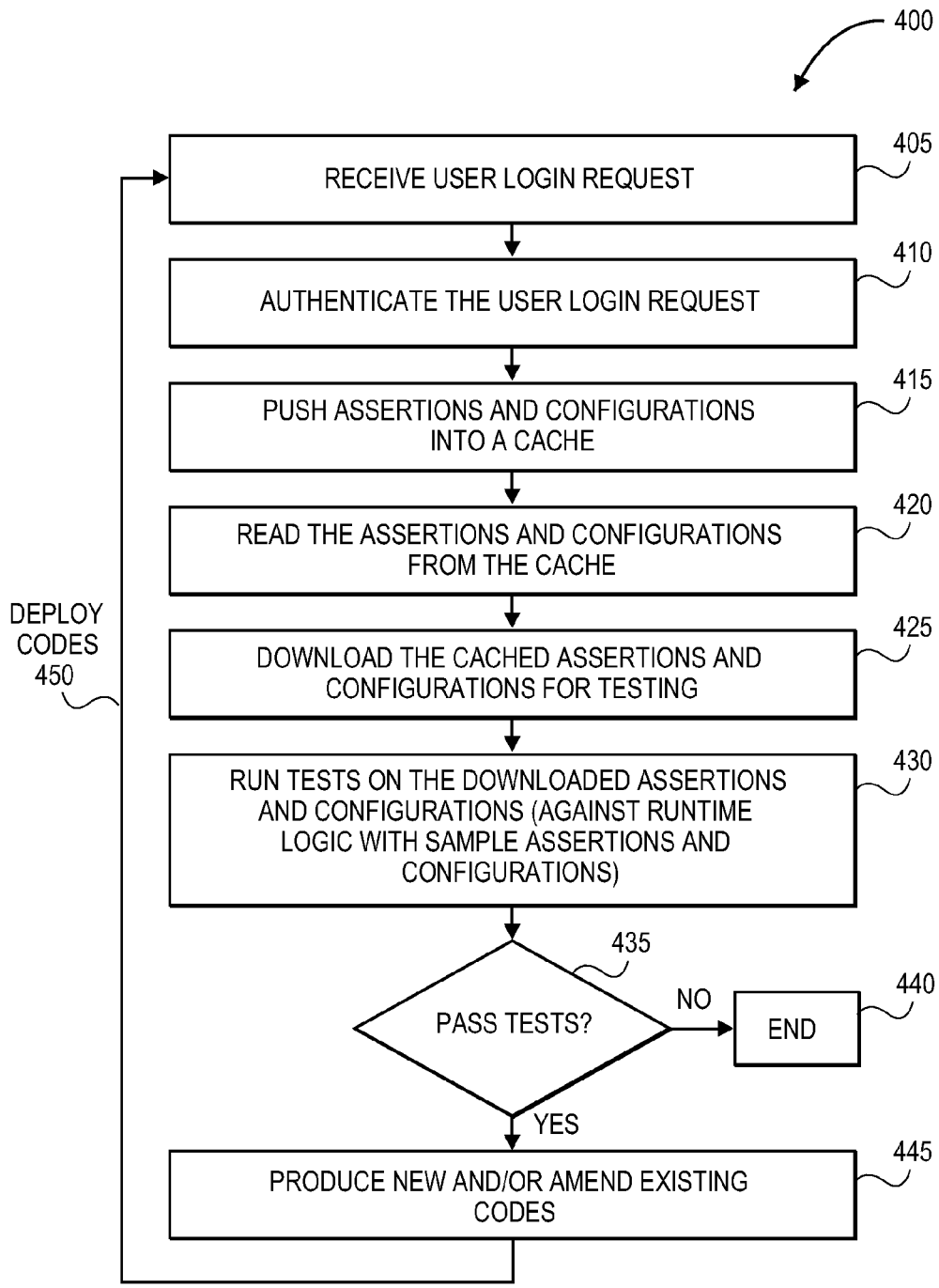
FIG. 4 illustrates a method for performing dynamic and continuous testing of assertions and configurations according to one embodiment.

FIG. 4 illustrates a method for performing dynamic and continuous testing of SAML assertions and configurations according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by dynamic and continuous testing mechanism 110 of FIG. 1.

Method 400 beings at block 405 with receiving of a user login request along with or as part of or followed by an SAML response having SAML assertion and configurations. At block 410, the user login is authenticated for the user to be able to access one or more software applications hosted by a service provider. At block 415, the assertions and configurations obtained from the SAML response are pushed into a cache. At block 420, the cached assertions and configurations are accessed and read. At block 425, the read/cached assertions and configurations are downloaded into a testing cache for testing purposes such that tests may be run on these downloaded assertions and configurations.

At block 430, in one embodiment, tests are run on the downloaded assertions and configurations where testing may include running the downloaded assertions and configurations against runtime logic and sample assertions and configurations that may be based on historical information, such as previously-tested assertions and configurations. At block 435, a determination is made as to whether the assertions and configurations passed the test. In other words, if no new or different information (e.g., different login, different credentials, etc.) is detected in the SAML assertions and configurations, the process ends at block 440. If some new or different information is detected in the assertions and configurations, the testing results are forwarded on to the production/deployment logic 210 of FIG. 2 so that new codes can be generated and/or modifications to any existing codes can be made using the testing results. At block 445, new codes are produced and/or existing codes are amended or modified. Any newly-generated codes and/or newly-modified codes are deployed, at 450, so they can be used in relation to future user logins.

Figure 5:
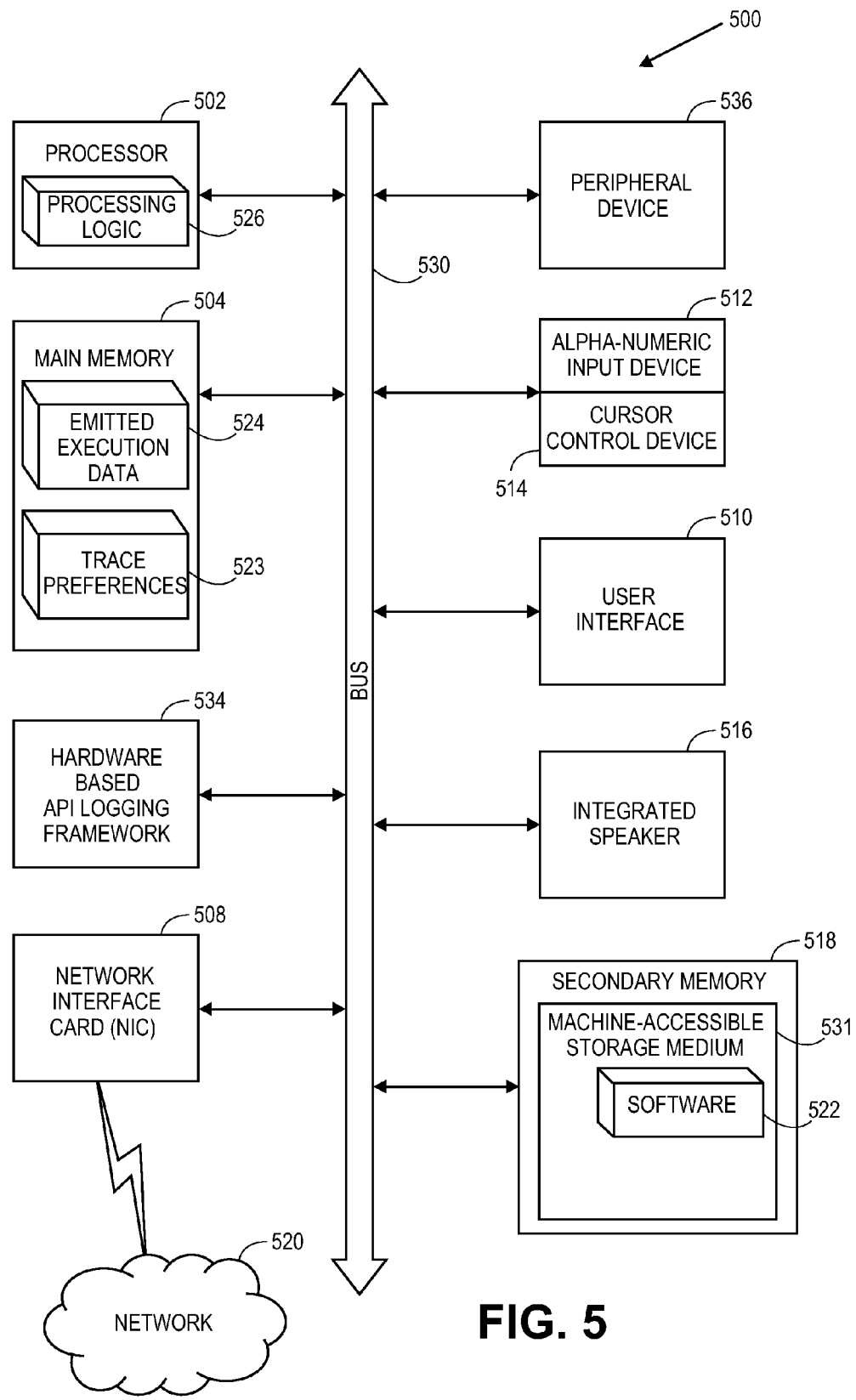
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 of FIG. 1. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic testing mechanism 110 as described with reference to FIGS. 1 and 2 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic testing mechanism 110 as described with reference to FIGS. 1 and 2 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
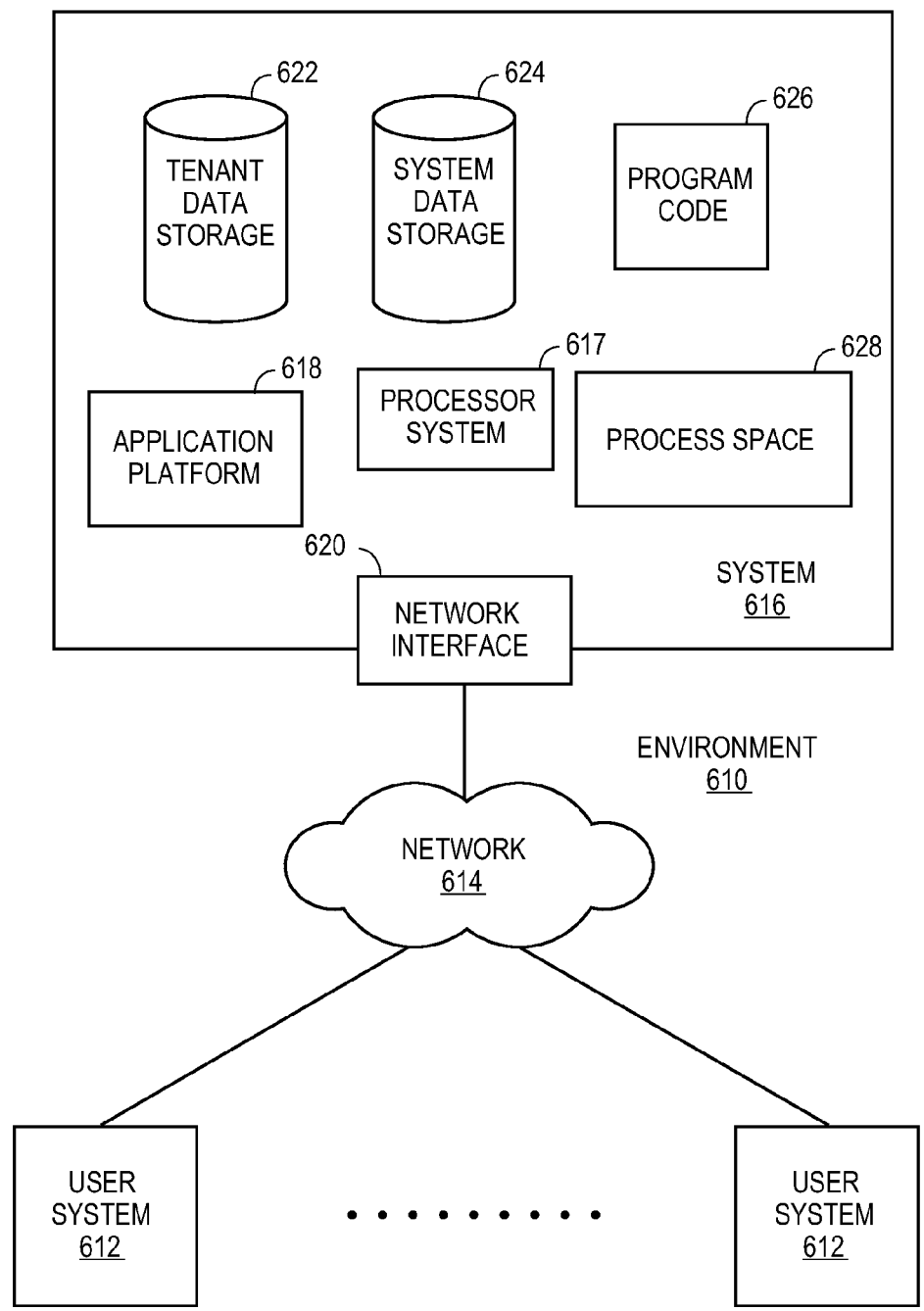
FIG. 6 illustrates a block diagram of an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
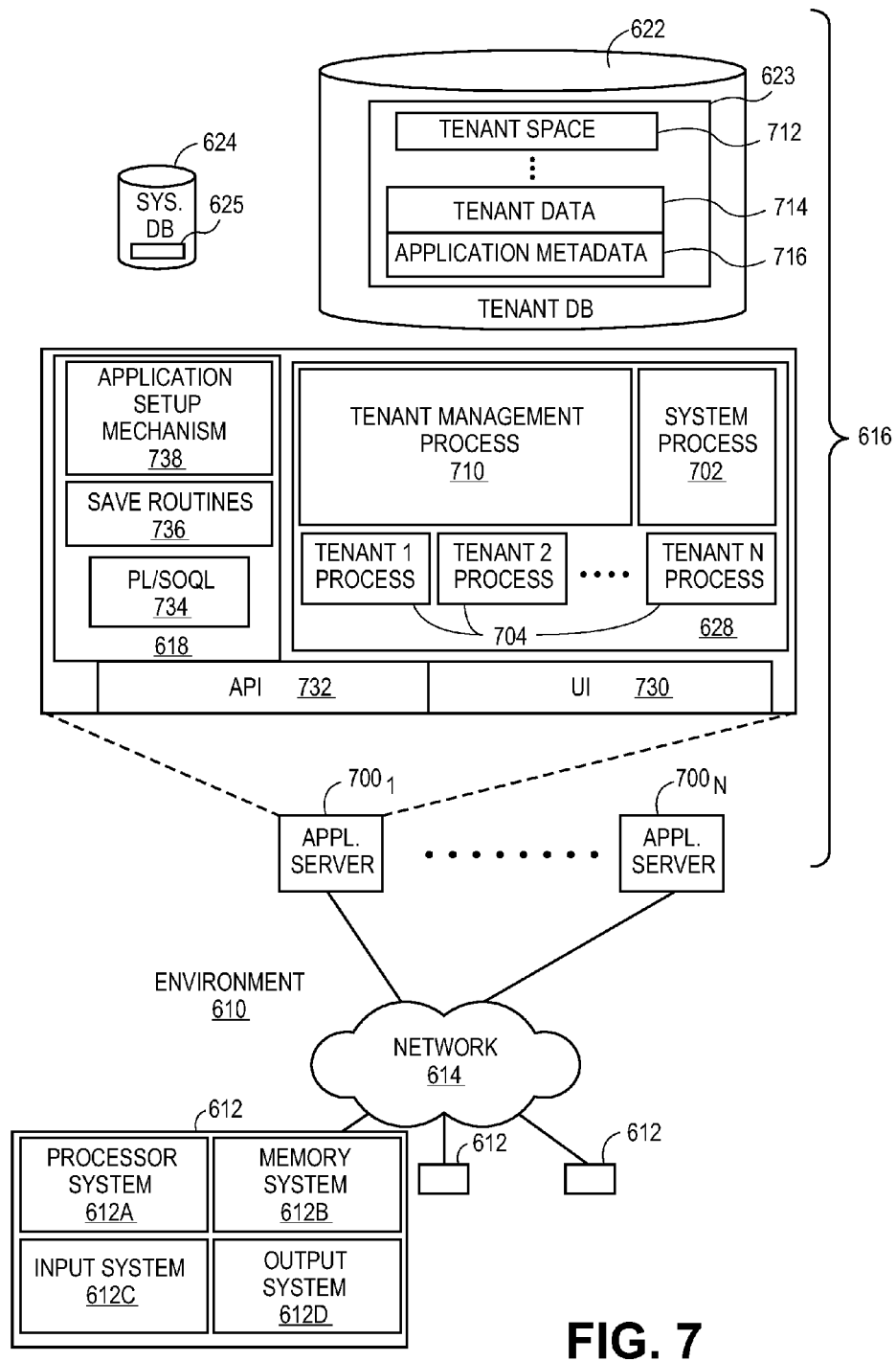
FIG. 7 illustrates a block diagram of an embodiment of elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A method comprising:
   receiving, by a computing device, a request, via an identity provider, to access one or more software applications hosted by a service provider in an on-demand service environment, wherein the request includes security assertions relating to at least one of an organization and a user seeking the access to the one or more software applications, wherein the user is associated with the organization;
   identifying at least one of the organization and the user based on the security assertions;
   dynamically and continuously performing, in runtime, testing of the security assertions at a testing cache, wherein testing includes comparing the security assertions against sample assertions relating to one or more of the organization, other organizations, and one or more access modes;

generating, based on the testing, a new code or modifying an existing code relating to the security assertions;

placing the security assertions into a testing cache prior to the testing, wherein the sample assertions include at least one of newly-received sample assertions and previously-received sample assertions relating to one or more of the organization, the other organizations, the one or more access modes; and dynamically deploying the generated and modified codes for processing future requests for access and subsequent automatic authentications relating to one or more of the organization, the other organizations, the user, other users, and the one or more access modes.

2. The method of claim 1, wherein the new and modified codes are used to update the security assertions and other security assertions subsequently obtained via the identity provider to facilitate future access to the one or more software applications at the service provider without having to verify or authenticate the user or the organization.

3. The method of claim 1, wherein the user and the other users include one or more of customers of the organization or the other organizations, wherein the customers include one or more of individuals, businesses including companies or corporations, government agencies, educational institutions, and non-profit entities.

4. The method of claim 1, wherein the computing device comprises one or more of a server computer, a laptop computer, a smartphone, a personal digital assistant (PDA), a handheld computer, an e-reader, a tablet computer, a notebook, a desktop computer, a cluster-based computer, a set-top box, and a Global Positioning System (GPS)-based navigation system, wherein the identity and service providers include entities employing computing devices.

5. A system comprising:
a computing device having a memory to store instructions, and a processing device, coupled with the memory, to execute the instructions, wherein the instructions cause the processing device to perform one or more operations comprising:
receiving a request, via an identity provider, to access one or more software applications hosted by a service provider in an on-demand service environment, wherein the request includes security assertions relating to at least one of an organization and a user seeking the access to the one or more software applications, wherein the user is associated with the organization;
identifying at least one of the organization and the user based on the security assertions;
dynamically and continuously performing, in runtime, testing of the security assertions at a testing cache, wherein testing includes comparing the security assertions against sample assertions relating to one or more of organization, other organizations, and one or more access modes;
generating, based on the testing, a new code or modifying an existing code relating to the security assertions;
placing the security assertions into a testing cache prior to the testing, wherein the sample assertions include at least one of newly-received sample assertions and previously-received sample assertions relating to one or more of the organization, the other organizations, and the one or more access modes; and
dynamically deploying the generated and modified codes for processing future requests for access and subsequent automatic authentications relating to one or more the organization, the other organizations, the user, other users and the access mode, and the one or more access modes.

6. The system of claim 5, wherein the new and modified codes are used to update the security assertions and other security assertions subsequently obtained via the identity provider to facilitate future access to the one or more software applications at the service provider without having to verify or authenticate the user or the organization.

7. The system of claim 5, wherein the user and the other users include one or more of customers of the organization or the other organizations, wherein the customers include one or more of individuals, businesses including companies or corporations, government agencies, educational institutions, and non-profit entities.

8. The system of claim 5, wherein the computing device comprises one or more of a server computer, a laptop computer, a smartphone, a personal digital assistant (PDA), a handheld computer, an e-reader, a tablet computer, a notebook, a desktop computer, a cluster-based computer, a set-top box, and a Global Positioning System (GPS)-based navigation system, wherein the identity and service providers include entities employing computing devices.

9. A non-transitory machine-readable medium having stored thereon instructions which, when executed by a machine, cause the machine to perform one or more operations comprising:
receiving a request, via an identity provider, to access one or more software applications hosted by a service provider in an on-demand service environment, wherein the request includes security assertions relating to at least one of an organization and a user seeking the access to the one or more software applications, wherein the user is associated with the organization;
identifying at least one of the organization and the user based on the security assertions;
dynamically and continuously performing, in runtime, testing of the security assertions at a testing cache, wherein testing includes comparing the security assertions against sample assertions relating to one or more of primary organization, other organizations, and one or more access modes;
generating, based on the testing, a new code or modifying an existing code relating to the security assertions;
placing the security assertions into a testing cache prior to the testing, wherein the sample assertions include at least one of newly-received sample assertions and previously-received sample assertions relating to one or more of the organization, the other organizations, and the one or more access modes; and
dynamically deploying the generated and modified codes for processing future requests for access and subsequent automatic authentications relating to one or more the organization, the other organizations, the user, other users, and the access mode and the one or more access modes.

10. The non-transitory machine-readable medium of claim 9, wherein new and modified codes are used to update the security the assertions and other security assertions subsequently are obtained via the identity provider to facilitate future access to the one or more software applications at the service provider without having to verify or authenticate the user or the organization.

11. The non-transitory machine-readable medium of claim 9, wherein the user and the other users include one or more of customers of the organization or the other organizations, wherein the customers include one or more of individuals, businesses including companies or corporations, government agencies, educational institutions, wherein the computing device comprises one or more of a server computer, a laptop computer, a smartphone, a personal digital assistant (PDA), a handheld computer, an e-reader, a tablet computer, a notebook, a desktop computer, a cluster-based computer, a set-top box, and a Global Positioning System (GPS)-based navigation system, wherein the identity and service providers include entities employing computing devices.

* * * * *